United States Patent [19]

Bostrom et al.

[11] Patent Number: 5,140,099
[45] Date of Patent: Aug. 18, 1992

[54] WATER SOLUBLE NONIONIC CELLULOSE ETHERS AND THEIR USE IN PAINTS

[75] Inventors: Peter Bostrom, Kungalv; Ingemar Ingvarsson; Kenneth Sundberg, both of Stenungsund, all of Sweden

[73] Assignee: Berol Nobel AB, Stenungsund, Sweden

[21] Appl. No.: 493,092

[22] Filed: Mar. 12, 1990

[51] Int. Cl.$^5$ .................. C08B 11/193; C08J 3/03
[52] U.S. Cl. ........................ 536/91; 524/42; 524/43; 524/44
[58] Field of Search ............... 536/91; 524/42, 43, 524/44

[56] References Cited

U.S. PATENT DOCUMENTS

| | | | |
|---|---|---|---|
| 4,485,211 | 11/1984 | Okamoto | 525/57 |
| 4,845,207 | 7/1989 | t'Sas | 536/91 |
| 4,902,733 | 2/1990 | Angerer | 524/44 |

Primary Examiner—Nathan M. Nutter
Assistant Examiner—Jeffrey Culpeper Mullis

[57] ABSTRACT

Water soluble nonionic cellulose ethers are provided, containing mixed alkylphenoxyalkyleneoxy-2-hydroxy propylene groups, having hydrophilic units composed of (a) alkyleneoxy groups of two or three carbon atoms, in a number from zero to about six, selected from —CH$_2$CH$_2$O—;

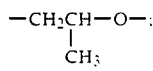

and —CH$_2$CH$_2$CH$_2$O—; and (b) one 2-hydroxy propylene group, together with hydrophobic units which are alkylphenoxy groups of the formula

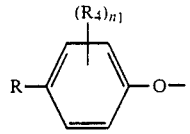

where R and R$_4$ are hydrocarbon groups having from about four to about thirty carbon atoms, preferably from about nine to about eighteen carbon atoms; n$_1$ is 0 or 1; connected linearly in a group of the general formula:

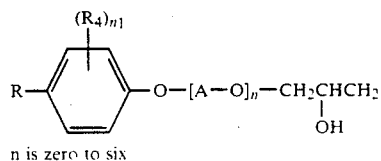

n is zero to six

A—O is alkyleneoxy
as above

Also provided is a class of cellulose ethers having similar hydrophilic units and hydrophobic units which are alkyloxyalkyleneoxy groups of the formula

R—O—  III where R is an alkyl group having from about four to about thirty carbon atoms, preferably from about nine to about eighteen carbon atoms, connected linearly in a group of the general formula $$R-O-[A-O]_n-CH_2CHCH_2 \atop \phantom{R-O-[A-O]_n-CH_2C}OH \qquad IV$$

n is one to six

A—O is alkyleneoxy
as above as well as water-base paints with excellent properties containing such cellulose ethers.

43 Claims, No Drawings

WATER SOLUBLE NONIONIC CELLULOSE ETHERS AND THEIR USE IN PAINTS

Cellulose is a polymer of glucose residue or anhydro glucose units arranged in pairs in cellobiose chains of the unit structure:

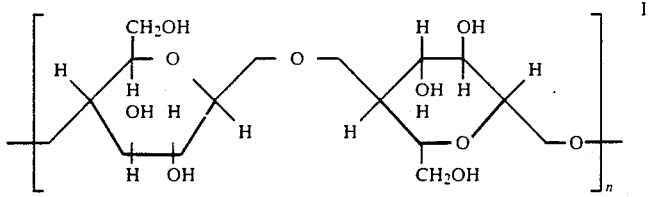

where n is the number of cellobiose units in the chain.

Each anhydroglucose unit has one hydroxymethyl and two active hydroxyl groups on the anhydroglucose units, which can be etherified by organic halides, alkene oxides or olefins activated by polar substituent groups, in the presence of alkali. The resulting ethers have groups corresponding to the organic group of the etherifying reagent, attached to the anhydroglucose molecule via an ether group —O—, such as alkyl, hydroxyalkyl, carboxyalkyl, alkyl phenyl (for example, benzyl) and substituted alkyl (for example, cyanoethyl), including mixtures of such groups, such as alkyl hydroxyalkyl cellulose ethers.

Such etherifying groups modify the water-solubility of the cellulose, depending upon the relative hydrophobicity or hydrophilicity of the group. Hydrocarbon groups such as alkyl or alkylphenyl tend to reduce water solubility, while hydrophilic groups such as hydroxyethyl or hydroxypropyl tend to increase water-solubility. Mixtures of such groups, such as alkyl with hydroxyalkyl, increase or decrease water solubility, according to their relative proportions on the cellulose molecule. Accordingly, a variety of mixed cellulose ethers have been developed, with a water-solubility or hydrophilicity tailored to meet use requirements.

Water-soluble cellulose ethers, and particularly the nonionic ethers, have valuable water-thickening properties and in consequence have a large number of application areas, such as in paints, mortars, plasters, drugs and food. In the making of water-base paints, nonionic cellulose ethers are advantageous because the viscosity-increasing effect is relatively unaffected by additives, such as tinting colorants. However, with increasing molecular weight, cellulose ethers impart relatively low viscosities at high shear rates, and poor levelling, which means inadequate hiding power.

To overcome these difficulties, the art has continued to develop new varieties of mixed cellulose ethers, having a selection of hydrophobic groups such as alkyl and hydrophilic groups such as hydroxyalkyl, in relative proportions and in a degree of substitution to produce a modified thickening effect.

Thus, Landoll, U.S. Pat. No. 4,228,277, patented Oct. 14, 1980, provides modified nonionic cellulose ethers which have sufficient nonionic substitution to render them water soluble and which are further modified with a $C_{10}$ to $C_{24}$ long chain alkyl group in an amount between about 0.2% by weight and the amount which makes them less than 1% soluble in water. Hydroxyethyl cellulose is a preferred water-soluble cellulose ether for modification. These products are claimed to exhibit a substantially improved viscosifying effect, compared to their unmodified cellulose ether counterparts, and also exhibit some surface activity.

The cellulose ethers have a sufficient degree of nonionic substitution selected from the class consisting of methyl, hydroxyethyl and hydroxypropyl to cause them to be water-soluble and Landoll further substitutes them with a hydrocarbon radical having about 10 to 24 carbon atoms in an amount between about 0.2 weight percent and the amount which renders the cellulose ether less than 1% by weight soluble in water. The cellulose ether to be modified is preferably one of low to medium molecular weight, i.e., less than about 800,000 and preferably between about 20,000 and 500,000 (about 75 to 1800 D.P.).

Landoll acknowledges that cellulose ethers have heretofore been modified with small hydrophobic groups such as ethyl, butyl, benzyl and phenylhydroxyethyl groups. Such modifications or such modified products are shown in U.S. Pat. Nos. 3,091,542; 3,272,640; and 3,435,027 inter alia. These modifications are usually effected for the purpose of reducing the hydrophilicity and thus reducing the hydration rate of the cellulose ether. These modifiers have not been found to effect the property improvements caused by the modifications contemplated by Landoll's invention. There is no significant alteration of the rheological properties or the surface-active properties of the ether.

The long chain alkyl modifier can be attached to the cellulose ether substrate via an ether, ester or urethane linkage. Preferred is the ether linkage as the reagents most commonly used to effect etherification are readily obtained, the reaction is similar to that commonly used for the initial etherification, and the reagents are usually more easily handled than the reagents employed for modification via the other linkages. The resulting linkage is also usually more resistant to further reactions.

Although Landoll refers to his products as being "long chain alkyl group modified", he asserts that except in the case where modification is effected with an alkyl halide, the modifier is not a simple long chain alkyl group. The group is actually an alphahydroxyalkyl radical in the case of an epoxide, a urethane radical in the case of an isocyanate, or an acylradical in the case of an acid or acyl chloride. Nonetheless, the terminology "long chain alkyl group" is used since the size and effect of the hydrocarbon portion of the modifying molecule complete obscure any noticeable effect from the connecting group. Properties are not significantly different from those of the product modified with the simple long chain alkyl group.

Landoll U.S. Pat. No. 4,243,802, patented Jan. 6, 1981, suggested that cellulose ethers containing an amount of hydroxypropyl, hydroxyethyl, or methyl radicals such that they are normally water soluble and further modified with $C_{12}$ to $C_{24}$ hydrocarbon radicals to a level at which they are water insoluble, are soluble in surfactants, and effect substantial viscosity increases in solutions of surfactants. They also are highly effective emulsifiers in aqueous systems.

These cellulose ethers are low to medium molecular weight cellulose ethers having a sufficient degree of nonionic substitution selected from the class consisting of methyl, hydroxyethyl, and hydroxypropyl radicals to cause them to be normally soluble and further substituted with a hydrocarbon radical having 10 to 24 carbon atoms in an amount sufficient to render them water-insoluble but less than about 8% by weight based on the total weight of the modified cellulose ether. The cellulose ether is preferably one which, prior to modification, has a molecular weight between about 20,000 and 500,000 (about 75 to 1800 D.P.) and most preferably between about 20,000 and 80,000 (75 to 300 D.P.).

The long chain alkyl modifier can be attached to the cellulose ether substrate via an ether, ester or urethane linkage. Preference is the ether linkage.

Again, as in U.S. Pat. No. 4,228,277, Landoll refers to his products as being "long chain alkyl group modified"; it will be recognized that except in the case where modification is effected with an alkyl halide, the modifier is not a simple long chain alkyl group. The group is actually an alphahydroxyalkyl radical in the case when an epoxide is used, a urethane radical in the case of an isocyanate, or an acyl radical in the case of an acid or acyl chloride. Nonetheless, the terminology "long chain alkyl group" is used since the size and effect of the hydrocarbon portion of the modifying molecule substantially obscures any noticeable effect from the connecting group. Properties are not significantly different from those of the product modified with the simple long chain alkyl group.

Landoll gives no data or other factual material in either of these patents supporting this assertion that the connecting group is inert or without effect. Apparently, Landoll worked only with ether, ester or urethane connecting groups. The Examples of each patent illustrate mainly ether connecting groups. Only U.S. Pat. No. 4,228,277 has one Example illustrating a urethane connecting group. Nonetheless, while such newer mixed cellulose ethers have certain improved properties, compared with conventional nonionic cellulose ethers, they still exhibit poor levelling and a comparatively low high shear viscosity.

In accordance with the present invention, a new approach is made in lieu of the usual approach of the prior art of modifying the cellulose ether by adding to the cellulose molecule various groups that are each hydrophobic or hydrophilic in character, in relative proportions selected to adjust water solubility or insolubility and other properties, as required. In the present invention, groups are added that within the group include hydrophilic and hydrophobic portions, so selected in structure and number as to modify the base cellulose ether to impart the desired hydrophobic or hydrophilic character. Since each group thus added is both hydrophilic and hydrophobic in nature, but has an overall hydrophilicity or hydrophobicity that is determined by the structure of the group, one can more precisely control the properties of the modified cellulose ether. There are at most three active hydroxyl groups per anhydroglucose unit on the cellulose molecule, and in ethyl cellulose these are reduced by the number of ethyl groups, while in hydroxyethyl cellulose they may be displaced away from the cellulose molecule by hydroxyethyl groups, so there is a limit to the number of substituent groups that can be attached thereto. When the groups added themselves have a controllable hydrophobicity or hydrophilicity, the versatility and possibilities of the addition are greatly increased. As a result, the modified cellulose ethers of the invention are superior in many properties, especially in thickening effect, than the prior cellulose ethers heretofore available.

For example, it has been found that water-base paints with excellent properties can be obtained using this new type of water soluble nonionic cellulose ether as a thickener.

In the general Formulae II to XIV, inclusive, which follow, the same letters R, $R_1$, $R_2$, $R_3$, $R_4$, AO and BO refer to the same groups and the same letters $m_1$, $m_2$, $m_3$, $m_4$, $n_1$, $n_2$, $n_3$, $n_4$ refer to the same subscripts, but the definitions thereof may vary according to the formula, so each letter or subscript in the discussion is followed by the formula number in which it occurs.

The hydrophilic units in this new type of nonionic cellulose ether are of two kinds:

(1) alkyleneoxy groups of two or three carbon atoms, in a number from zero to about six, selected from $-CH_2CH_2O-$;

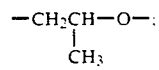

and $-CH_2CH_2CH_2O-$; preferably $CH_2CH_2-O$;

(2) 2-hydroxy propylene groups of the formula

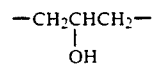

The hydrophobic units are alkylphenoxy groups of the formula

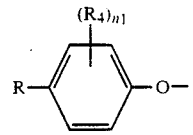

where R-II and $R_4$-II are hydrocarbon groups having from about four to about thirty carbon atoms, preferably from about nine to about eighteen carbon atoms; $n_1$-II is 0 or 1.

These are connected linearly in a group of the general formula:

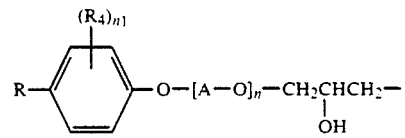

n-III is from 0 to about 6
A—O-III is alkyleneoxy as above

Accordingly, one class of the cellulose ethers of the invention have the following general formula:

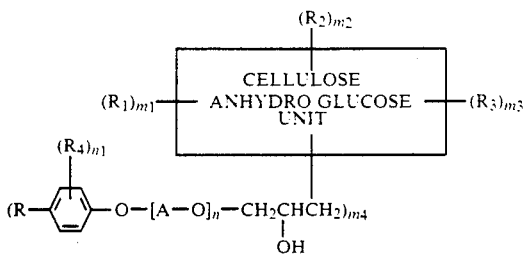

where
$R_1$-IV, $R_2$-IV and $R_3$-IV are selected from
   (a) alkyl having from one to four carbon atoms, such as methyl, ethyl, propyl, isopropyl, butyl, isobutyl, sec-butyl, and tert-butyl;
   (b) hydroxyalkyl having from two to four carbon atoms, such as hydroxyethyl, hydroxypropyl and hydroxybutyl;
   (c) alkylphenyl having from seven to nine carbon atoms, such as benzyl, propylphenyl, butylphenyl, amylphenyl, hexylphenyl, octylphenyl, and dodecylphenyl;
R-IV and $R_4$-IV are alkyl having from about four to about eighteen carbon atoms;
n-IV is 0 to about 6, preferably 1 to 4;
$n_1$-IV is 0 or 1;
$m_1$-IV, $m_2$-IV and $m_3$-IV are 0 to 3; $m_4$-IV is 0.002 to 0.2, preferably 0.005 to 0.1.
$m_1$, $m_2$, $m_3$ and $m_4$ are the degree of substitution and are selected to give the desired water-solubility or water-insolubility to the cellulose molecule. Since they are average numbers, they need not be whole numbers.
n-IV and $n_1$-IV and the structures of AO-IV, R-IV and $R_4$-IV are selected to give the desire hydrophilicity or hydrophobicity to the

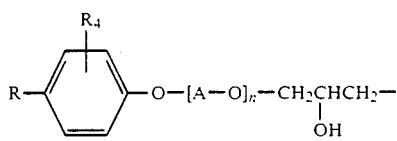
V group. Since they are average numbers, they need not be whole numbers.

Another class of cellulose ethers of the invention have as hydrophilic units:
   (1) alkyleneoxy groups of two or three carbon atoms, in a number from zero to about six, selected from $-CH_2CH_2O-$;

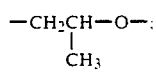

and $-CH_2CH_2CH_2O-$; preferably $CH_2CH_2-O$;
   (2) 2-hydroxy propylene groups of the formula

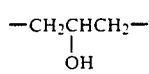

The hydrophobic units are alkoxyalkyleneoxy groups of the formula

VI where R-VI is an alkyl group having from about four to about thirty carbon atoms, preferably from about nine to about eighteen carbon atoms;

These are connected linearly in a group of the general formula:

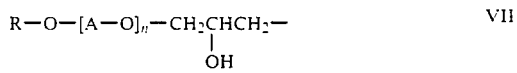
VII n-VII is 1 to 6
A—O-VII is alkyleneoxy
as above

Accordingly, these cellulose ethers of the invention have the following general formula:

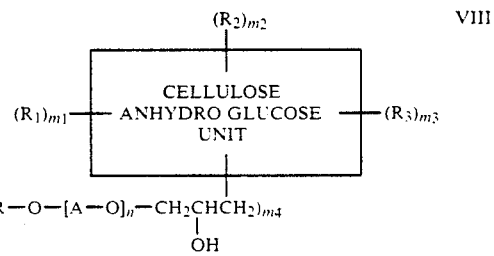
VIII where
$R_1$-VIII, $R_2$-VIII and $R_3$-VIII are selected from
   (a) alkyl having from one to four carbon atoms, such as methyl, ethyl, propyl, isopropyl, butyl, isobutyl, sec-butyl, and tert-butyl;
   (b) hydroxyalkyl having from two to four carbon atoms, such as hydroxyethyl, hydroxypropyl and hydroxybutyl;
   (c) alkylphenyl having from about seven to about nine carbon atoms, such as benzyl, propylphenyl, butylphenyl, amylphenyl, hexylphenyl, octylphenyl, and dodecylphenyl;
R-VIII is alkyl having from about eight to about thirty carbon atoms; preferably from about ten to about twenty-four carbon atoms;
n-VIII is 1 to about 6, preferably 1 to 4;
$m_1$-VIII, $m_2$-VIII and $m_3$-VIII are 0 to 3; $m_4$-VIII is 0.002 to 0.2, preferably 0.005 to 0.1.
$m_1$, $m_2$, $m_3$ and $m_4$ are the degree of substitution and are selected to give the desired water-solubility or water-insolubility to the cellulose molecule. Since they are average numbers, they need not be whole numbers.
n-VIII and the structures of AO-VIII and R-VIII are selected to give the desired hydrophilicity or hydrophobicity to the

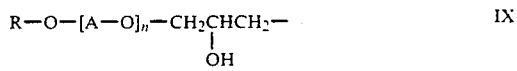
IX group. Since they are average numbers, they need not be whole numbers.

Another class of cellulose ethers of the invention have as hydrophilic units:
   (1) alkyleneoxy groups of two or three carbon atoms, in a number from zero to about six, selected from $-CH_2CH_2O-$;

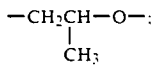

and —CH$_2$CH$_2$CH$_2$O—; preferably CH$_2$CH$_2$—O, of the formula —[A—O—]$_{n_1}$ where n$_1$ is from zero to about six;

(2) 2-hydroxy propylene groups of the formula

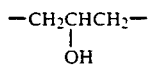

The hydrophobic units are (3) alkyleneoxy groups of three to six carbon atoms, in a number from one to about six, of the formula:

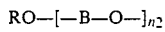   X

R-X is hydrogen or alkyl having from one to about nine carbon atoms;

BO-X is an alkyleneoxy group having from about three to about six carbon atoms, preferably from about three to about four carbon atoms; n$_1$-X is from 1 to about 6, preferably 1 to 4; and n$_2$-X is from 1 to about 30, preferably from 3 to 20.

These are connected linearly with —B—O— and A—O in any order in a group of the general formula:

$$RO-[B-O-]_{n_2}-[A-O]_{n_1}-CH_2CHCH_2- \atop \phantom{xxxxxxxxxxxxxxxxxxxxxxxxxx}|\phantom{xxx} \atop \phantom{xxxxxxxxxxxxxxxxxxxxxxxxxx}OH$$   XI n$_1$-X and n$_2$-X are as above
A—O-X is alkyleneoxy as above and
B—O-X is alkyleneoxy (3) above It will be understood that AO and BO groups can be present in blocks or singly and in any order according to the values of n$_1$ and n$_2$, but preferably the terminal group is R—O—B—O—XII, and the BO units are in a block.

Accordingly, these cellulose ethers of the invention have the following general formula:

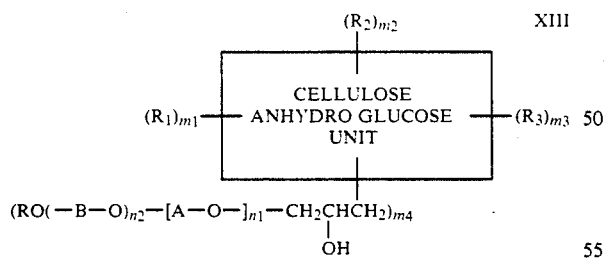   XIII where
R$_1$-XIII, R$_2$-XIII and R$_3$-XIII are selected from
(a) alkyl having from one to four carbon atoms, such as methyl, ethyl, propyl, isopropyl, butyl, isobutyl, sec-butyl, and tert-butyl;
(b) hydroxyalkyl having from two to four carbon atoms, such as hydroxyethyl, hydroxypropyl and hydroxybutyl;
(c) alkylphenyl having from about seven to about nine carbon atoms, such as benzyl, propylphenyl, butylphenyl, amylphenyl, hexylphenyl, octylphenyl, and dodecylphenyl;

R-XIII is hydrogen or alkyl having from about one to about nine carbon atoms;
n$_1$-XIII is 1 to about 6, preferably 1 to 4;
n$_2$-XIII is 1 to about 30, preferably 3 to 20;
m$_1$-XIII, m$_2$-XIII and m$_3$-XIII are 0 to 3; m$_4$-XIII is 0.002 to 0.2, preferably 0.005 to 0.1.

m$_1$, m$_2$, m$_3$ and m$_4$ are the degree of substitution and are selected to give the desired water-solubility or water-insolubility to the cellulose molecule. Since they are average numbers, they need not be whole numbers.

n$_1$-XIII and n$_2$-XIII and the structures of R-XIII, BO-XIII and AO-XIII are selected to give the desired hydrophilicity or hydrophobicity to the

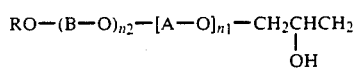   XIV group. Since they are average numbers, they need not be whole numbers.

Exemplary R-O-XIV-groups are butyl, amyl, hexyl, heptyl, octyl, nonyl, decyl, dodecyl, tetradecyl and octadecyl, all attached to —O—.

The amount of the group III, VII or X substituted on the cellulose molecule I is at least 0.3%, preferably between 0.3-6%, and most preferably 0.5-4% by weight of the cellulose ether III, VI, IX.

Exemplary R$_1$-XIV, R$_2$-XIV, R$_3$-XIV alkyl groups include methyl, ethyl and propyl; R$_1$-XIV, R$_2$-XIV, R$_3$-XIV hydroxyalkyl include hydroxyethyl and hydroxypropyl.

The values of m$_1$-XIV, m$_2$-XIV, m$_3$-XIV, m$_4$-XIV are preferably chosen so that the final nonionic cellulose ethers IV, VIII, XIII of the invention are water-soluble, that is, a solubility in water of at least 1% at 20° C., and a viscosity of from 100 to 1,000 mPa (Brookfield LV) in a 1% water solution.

Preferred base cellulose ethers to which the groups V, IX or XIV is added in accordance with the invention include methyl hydroxyethyl cellulose, methyl hydroxypropyl cellulose, methyl cellulose, hydroxyethyl cellulose, ethyl hydroxyethyl cellulose and methyl hydroxyethyl hydroxypropyl cellulose.

The base cellulose ethers are known, and are prepared using known process steps. An alkali cellulose is reacted in the presence of an alkaline catalyst with an epoxide or halide in order to substitute hydroxyalkyl groups and/or alkyl groups on hydroxyl groups of the cellulose I. To add the group V, IX, XIV, the alkali cellulose ether is then reacted with an epoxide corresponding to the group V, IX, XIV, for example, to add group V, an epoxide having the formula

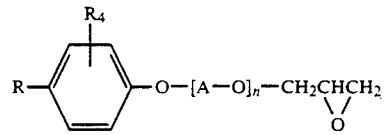

in which R, R$_4$, A and n are as in V, at elevated temperature in the presence of an alkaline catalyst.

It will be understood that when alkali cellulose is the starting base cellulose, the etherifying groups IV, VII, X will become attached to active hydroxyl group sides of the cellulose molecule. When ethyl cellulose or other alkyl cellulose ether is the starting base cellulose, the etherifying groups V, IX, XIV will become attached to any remaining active hydroxyl group sites not attached to ethyl or other alkyl etherifying groups. In the case of hydroxyalkyl cellulose as the base cellulose, however, the etherifying groups V, IX, XIV can become attached not only to remaining active hydroxy group stires but also to the hydroxyls of etherifying hydroxyalkyl groups.

The cellulose ethers of the invention can advantageously be used in flat, semi-flat, semi-gloss and gloss water base paints. The amounts added of the cellulose ethers vary depending on both the composition of the paints, and the degree of substitution and viscosity of the cellulose ethers, but normally the addition is within the range from about 0.2 to about 1% by weight of the paints.

Suitable binders for the paints are aqueous emulsion binders, such as alkyd resins, and aqueous latex binders, such as polyvinyl acetate, copolymers of vinyl acetate and methyl acrylate, copolymers of the vinyl acetate and ethylene, copolymer of vinyl acetate, ethylene and vinyl chloride, and copolymers of styrene and methyl acrylate. Preferred binders are latex binders stabilized with anionic surfactants.

Unlike conventional nonionic cellulose ethers, which thicken the water phase only, the cellulose ethers of the invention not only thicken the water phase but also, due to the presence of group V, associate with hydrophobic surfaces of the water-base paint. Thus, a network is formed which strongly contributes to the viscosity increase.

Because of the presence of group V, the cellulose ethers of the invention are more versatile thickeners than conventional nonionic cellulose ethers, and can be more precisely tailored to control and adjust the final paint properties to a higher extent and within closer limits than with other cellulose ethers. The present cellulose ethers can be used in all types of paints ranging from low to high PVC, interior as well as exterior. They contribute to the following paint properties:

low spatter
good film build
good flow and levelling
low sag

The following Examples represent preferred embodiments of the cellulose ethers of the invention.

EXAMPLE A

Nonylphenol ethoxylated with 1 mol ethylene oxide per mol nonylphenol to form the group

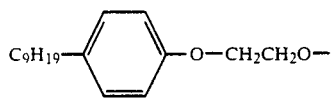

was reacted with epichlorohydrin to form the group V

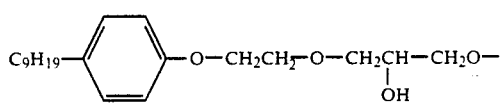

nonylphenyloxyethyloxy-2-hydroxypropyl, in the presence of tin tetrachloride at a temperature of 50°-55° C. The mol ratio between the ethoxylate and epichlorohydrin was 1:1. 1. Then an aqueous solution containing 30% by weight of sodium hydroxide was added at 80° C., and after 2 hours at 80° C. water was added, to dissolve the liberated NaCl. The resulting glycidyl ether was separated from the water phase, and used as follows to introduce group V into the cellulose ether.

Dissolving wood pulp was mercerized in an aqueous solution containing 21.5% sodium hydroxide for 30 minutes. The mercerized cellulose was pressed to a press factor of 2.4 and shredded. The shredded alkali cellulose was added to a reactor, and after evacuation of the air in the reactor, 1.5 grams of cyclohexane was added, per gram dissolving wood pulp. The mercerized cellulose was first reacted with 0.8 gram ethylene oxide for 75 minutes at 50° C., to introduce hydroxyethyl groups and form hydroxyethylcellulose, then with 0.125 gram of the above identified glycidyl ether for 120 minutes at 105° C., to introduce the group V, nonylphenyloxyethoxy-2-hydroxypropyl, into the hydroxyethyl cellulose. The resulting nonylphenyloxyethoxy-2-hydroxypropyl oxy hydroxyethyl cellulose was then mixed with acetone and water, and neutralized with acetic acid. After 1 hour the modified hydroxyethyl cellulose was separated by centrifugation, dried and milled to a powder. The cellulose ether had a $MS_{hydroxyethyl}=1.5$ and $DS_R=0.03$, where R is

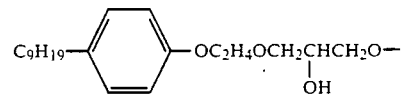

EXAMPLE B

Dissolving wood pulp was added to a reactor. After evacuation of the air in the reactor there were added per gram of the dissolving wood pulp 0.7 gram of an aqueous solution containing 45% by weight sodium hydroxide, followed by 0.85 g ethylene oxide, to introduce hydroxyethyl or hydroxyethyloxyethyl groups, 5 grams of ethyl chloride, to introduce ethyl groups, and 0.066 gram of the glycidyl ether prepared in Example A to introduce group IV. The temperature in the reactor was increased to 53° C., and held at 53° C. for 60 minutes. The temperature was then raised to 105° C., and held for 50 minutes. The reaction product was cooled, washed in boiling water and neutralized with acetic acid. The solid phase was separated by centrifuging and milled to a powder. The modified ethyl hydroxyethyl cellulose ether had a $MS_{hydroxyethyl}=1.6$, a $DS_{ethyl}=0.6$ and a $DS_R=0.009$, where R is

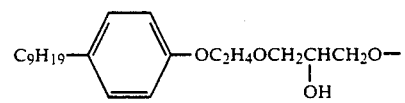

EXAMPLE C

Example B was repeated but the amount of glycidylether was 0.132 gram per gram dissolving wood pulp. The modified ethyl hydroxyethyl cellulose ether had a $MS_{hydroxyethyl}=1.6$, a $DS_{ethyl}=0.6$ and a $DS_R=0.016$, where R is

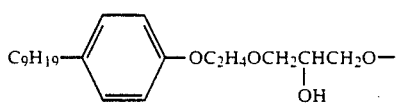

EXAMPLE D

Example B was repeated but instead of the glycidyl ether in Example B, a glycidyl ether having the general formula

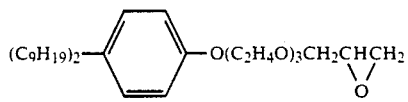

was added, in an amount of 0.165 gram per gram dissolving wood pulp. The modified ethyl hydroxyethyl cellulose ether had a $MS_{hydroxyethyl}=1.6$, a $DS_{ethyl}=0.6$ and a $DS_R=0.013$, where R is

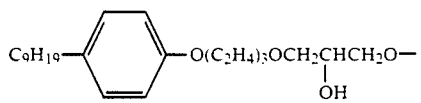

EXAMPLE E

Example B was repeated, but the amounts of ethyl chloride, epichlorhydrin and the glycidyl ether of Example A adjusted to produce a modified nonyl-phenyloxyethoxy-2-hydroxypropyloxy ethyl hydroxyethyl cellulose ether having $MS_{hydroxyethyl}=1.8$, $DS_{ethyl}=0.7$, $DS_R=0.012$, where R is

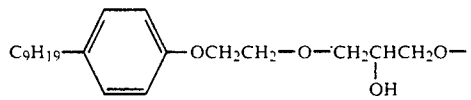

EXAMPLE F

Example B was repeated but instead of the glycidyl ether in Example B, an alkyl glycidyl ether having the general formula

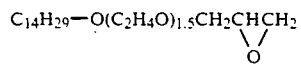

was added, and the amounts of ethyl chloride, epichlorhydrin and the glycidyl ether adjusted to produce a modified ethyl hydroxyethyl cellulose ether that had a $MS_{hydroxyethyl}=1.6$, a $DS_{ethyl}=0.6$ and a $DS_R=0.016$, where R is

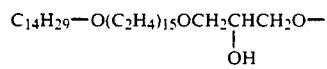

The following Examples represent preferred embodiments of water-base paints utilizing the cellulose ethers of the invention.

EXAMPLE 1

A flat interior latex paint was prepared from a premixture having the following composition:

|  | Parts by Weight | |
| --- | --- | --- |
|  | Example 1 | Control |
| Water | 259.0 | 259.0 |
| Cellulose ether of Example E[1] | 5.0 | — |
| Ethylhydroxyethyl cellulose[2] | — | 5.0 |
| Bactericide | 2.0 | 2.0 |
| Defoamer | 1.0 | 1.0 |
| Pigment dispersant | 3.7 | 3.7 |
| Nonionic surfactant | 3.0 | 3.0 |
| Propylene glycol | 15.0 | 15.0 |
| Titanium oxide | 100.0 | 100.0 |
| Calcined clay | 124.0 | 124.0 |
| Calcium carbonate, natural | 187.0 | 187.0 |

[1]$DS_{ethyl}=0.7$
$MS_{hydroxyethyl}=1.8$
$MS_R=0.012$ where R is $C_9H_{19}$—⟨phenyl⟩—$OC_2H_4OCH_2CH(OH)CH_2$ Viscosity = 3.200 mPa · s in 2% water solution

[2]$DS_{ethyl}=0.8$
$MS_{hydroxyethyl}=2.1$
Viscosity = 50000 mPa · s in 2% water solution
The premixtures were ground for 20 minutes and then the following ingredients were added to each:

Water 59.3
Coalescing agent 13.0
Styrene-acrylic latex 225.0
Defoamer 3.0

After homogenizing, the two latex paints containing the cellulose ether of the invention and the conventional ethylhydroxyethyl cellulose were tested for Stormer viscosity, high shear viscosity, levelling, and spatter resistance. The following results were obtained.

TABLE I

|  | Example 1 | Control |
| --- | --- | --- |
| Stormer, KU | 111 | 111 |
| High shear viscosity (ICI), Poise | 1.2 | 0.8 |
| Levelling, Leneta | 7 | 2 |
| Spatter resistance, rating 1–10, where 10 is no spatter | 9 | 5 |

From the results it is evident that in spite of the fact that the cellulose ether according to the invention in a 2% water solution has a viscosity of only 3,200 cP, the Stormer viscosity in the paint was the same as for the Control. A high application viscosity (ICI) is essential for good film build and optimum hiding power. The cellulose ether of the invention contributes to the high shear viscosity to a much greater extent than the conventional cellulose ether. The Leneta levelling and the spatter resistance show that also in these respects the cellulose ether of the invention is superior to the Control.

As a comparison with the cellulose ether of Landoll U.S. Pat. No. 4,228,277, Natrosol Plus, having a hydrophobic $C_{14}H_{29}$alkyl group attached to an ethyl hydroxyethyl cellulose ether base, was used in the same paint formulations as in Example 1, with the natural calcium carbonate replaced by a synthetic calcium carbonate, together with a cellulose ether of the invention:

|  | Parts by Weight Cellulose Ether of | |
|---|---|---|
|  | Example E | Landoll |
| Water | 259.0 | 259.0 |
| Cellulose ether of the invention Example E | 5.0 | — |
| Natrosol Plus | — | 5.0 |
| Bactericide | 2.0 | 2.0 |
| Defoamer | 1.0 | 1.0 |
| Pigment dispersant | 3.7 | 3.7 |
| Nonionic surfactant | 3.0 | 3.0 |
| Propylene glycol | 15.0 | 15.0 |
| Titanium oxide | 100.0 | 100.0 |
| Calcined clay | 124.0 | 124.0 |
| Calcium carbonate, natural | 187.0 | 187.0 |
| The premixtures were ground for 20 minutes and then the following ingredients were added to each: | | |
| Water | 59.3 | |
| Coalescing agent | 13.0 | |
| Styrene-acrylic latex | 225.0 | |
| Defoamer | 3.0 | |

After homogenizing, the two latex paints containing the cellulose ether of the invention and the conventional ethylhydroxyethyl cellulose were tested for Stormer viscosity, high shear viscosity, levelling, and spatter resistance. The following results were obtained.

TABLE A

| Cellulose ether of | Stormer KU | ICI Poise | Levelling Leneta |
|---|---|---|---|
| Example 1 | 96 | 2.7 | 4 |
| Landoll | 105 | 2.4 | 2 |

The comparison with the Landoll ether was repeated, but calcined clay was replaced by hydrous clay. The following results were obtained:

TABLE B

| Cellulose ether of | Stormer KU | ICI Poise | Levelling Leneta |
|---|---|---|---|
| Example 1 | 96 | 2.7 | 4 |
| Landoll | 105 | 2.4 | 2 |

From the above results in Tables A and B it is evident that the formulation containing cellulose either of the invention has a higher ICI-viscosity and a better levelling than that with Landoll ether, in spite of the fact that the Stormer viscosity was lower than in the comparison.

EXAMPLES 2 TO 6

Paints containing the cellulose ethers of Examples A, B, C, D and F as shown in the Table below were prepared in the same manner as in Example 1, according to the following formulation. Controls were also prepared using hydroxyethyl cellulose and ethyl hydroxyethyl cellulose, instead.

|  | Parts by Weight |
|---|---|
| Water | 188.5 |
| Cellulose ether | 3 |
| Defoamer | 1 |
| Bactericide | 1 |
| Pigment dispersant | 18 |
| Titanium dioxide | 185 |
| Calcined clay | 46 |
| Calcium carbonate | 120 |
| Mica | 46 |
| Coalescing agent | 10 |

-continued

|  | Parts by Weight |
|---|---|
| Acrylic latex | 370 |
| Defoamer | 3 |

The latex paints containing different cellulose ethers were tested with respect to the Stormer viscosity and high shear viscosity. The following results were obtained.

| Example No. | Cellulose ether of Example No. | Viscosity 2% aqueous solution | Paint Stormer KU | ICI Poise |
|---|---|---|---|---|
| 2 | A | 3,800 | 115 | 1.8 |
| 3 | B | 3,200 | 111 | 1.6 |
| 4 | C | 4,800 | 117 | 1.8 |
| 5 | D | 4,300 | 119 | 1.8 |
| 6 | F | 3,500 | 113 | 1.5 |
| Control A Hydroxy ethyl cellulose[1] |  | 1,750 | 96 | 1.4 |
| Control B Ethyl hydroxy ethyl cellulose[2] |  | 1,540 | 98 | 1.4 |

[1]$MS_{hydroxyethyl} = 1.5$
[2]$MS_{hydroxyethyl} = 1.6$  $DS_{ethyl} = 0.6$

From the results, it is clear that the introduction of the glycidyl group in the cellulose ethers increases their viscosities in aqueous solution, as well as the Stormer viscosity and high shear viscosity of the formulated paints. A comparison of the cellulose ethers of Examples A, B, C and D with that of Example F shows that the ethers having as R group V alkyl phenyl are superior to those having alkyl as R.

EXAMPLE 7

Latex paints containing the cellulose ether of the invention, Example 1, and ethylhydroxyethyl cellulose, the Control, were prepared according to the following formulation:

|  | Parts by Weight |
|---|---|
| Water | 225 |
| Cellulose ether | 4.5 |
| Bactericide | 1.8 |
| Defoamer | 1.8 |
| Propylene glycol | 46.4 |
| Pigment dispersant | 4.9 |
| pH-buffer | 1.8 |
| Titanium dioxide | 178.9 |
| Hydrous clay | 44.7 |
| Surfactant | 3.6 |
| Coalescing agent | 17.9 |
| Acrylic latex | 465.1 |
| Defoamer | 3.6 |

After homogenizing, the latex paints were tested regarding Stormer viscosity, high shear viscosity, levelling and spatter resistance. The following results were obtained.

|  | Cellulose ether | |
|---|---|---|
|  | Example 7 | Control[1] |
| Stormer, KU | 100 | 100 |
| High shear viscosity (ICI) Poise | 1.5 | 1.2 |
| Levelling, Leneta | 7 | 5 |
| Spatter resistance | 9 | 5 |

-continued

|  | Cellulose ether | |
|---|---|---|
|  | Example 7 | Control[1] |
| (10 = no spatter) |  |  |

[1]$MS_{hydroxyethyl}$ = 0.8 $DS_{ethyl}$ = 2.1 Viscosity = 10,000 cP in 2% water solution From the results it is evident that in spite of the fact that the cellulose ether of Example 1 in a 2% water solution has a viscosity of only 3,200 cP, the Stormer viscosity of the paint formulated according to the invention was equal to the formulation containing the conventional cellulose ether. High shear viscosity, levelling and spatter were essentially improved by the cellulose ether of the invention.

Having regard to the foregoing disclosure, the following is claimed as the inventive and patentable embodiments thereof:

1. Water soluble nonionic cellulose ethers comprising hydrophobic unit-hydrophilic unit ether groups which are alkyphenoxyalkyleneoxy-2-hydroxypropylene ether groups, the hydrophilic ether units being from one to six alkyleneoxy groups of two or three carbon atoms, selected from $-CH_2CH_2O-$; $-CH_2CH-O-$; and $-CH_2CH_2CH_2O-$; and one 2-hydroxypropylene group, the hydrophobic ether units being alkylphenoxy groups of the formula

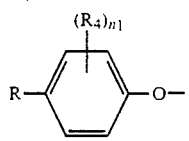

where R and $R_4$ are hydrocarbon groups having from about four to about thirty carbon atoms; and $n_1$ is 0 or 1; connected linearly in a group of the general formula:

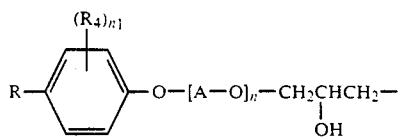

where AO is alkyleneoxy and n is from 1 to about 6.

2. Water-soluble nonionic cellulose ethers according to claim 1 wherein the alkyleneoxy is $-CH_2CH_2O-$.

3. Water-soluble nonionic cellulose ethers according to claim 1 wherein R is alkyl.

4. Water-soluble nonionic cellulose ethers according to claim 1 wherein $n_1$ is 4.

5. Water-soluble nonionic cellulose ethers according to claim 1 wherein n is 1.

6. Water-soluble nonionic cellulose ethers according to claim 1 wherein n is 2.

7. Water-soluble nonionic cellulose ethers according to claim 1 wherein n is 3.

8. Water-soluble nonionic cellulose ethers according to claim 1 wherein R is nonyl.

9. Water-soluble nonionic cellulose ethers according to claim 1 wherein $n_1$ is 1 and R and $R_4$ are both butyl.

10. Water-soluble nonionic cellulose ethers according to claim 1 wherein the alkylphenyloxyalkyleneoxy-2-hydroxy propylene oxy group is:

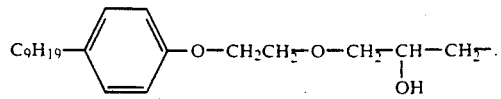

11. Water-soluble nonionic cellulose ethers according to claim 1 having the formula:

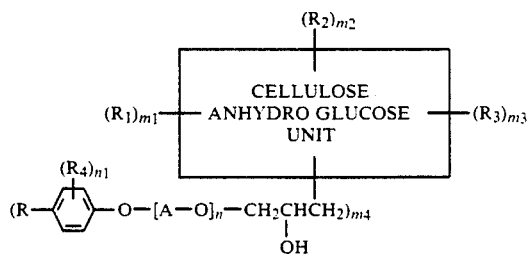

wherein:

$R_1$, $R_2$ and $R_3$ are selected from
(a) alkyl having from one to four carbon atoms;
(b) hydroxyalkyl having from two to four carbon atoms;
(c) alkylphenyl having from about seven to about nine carbon atoms;

R and $R_4$ are alkyl having from about four to about eighteen carbon atoms;

n is 1 to about 6;

$n_1$ is 0 or 1; n and $n_1$ are average numbers;

$m_1$, $m_2$ and $m_3$ are 0 to 3; and $m_4$ is 0.002 to 0.2;

$m_1$, $m_2$, $m_3$ and $m_4$ are average numbers representing the degree of substitution.

12. Water soluble cellulose ethers according to claim 11 wherein $m_1$ is from 1 to 3, $m_2$ and $m_3$ are zero and $m_4$ is from 0.005 to 0.1.

13. Water soluble cellulose ethers according to claim 12 wherein $R_1$ is hydroxyethyl.

14. Water soluble cellulose ethers according to claim 12 wherein $R_1$ is methyl.

15. Water soluble cellulose ethers according to claim 11 wherein $m_1$ and $m_2$ are each from 1 to 3, and $m_4$ is from 0.005 to 0.1.

16. Water soluble cellulose ethers according to claim 15 wherein $R_1$ is hydroxyethyl and $R_2$ is ethyl.

17. Water soluble cellulose ethers according to claim 15 wherein $R_1$ is hydroxyethyl and $R_2$ is methyl.

18. Water soluble cellulose ethers according to claim 15 wherein $R_1$ is hydroxypropyl and $R_2$ is methyl.

19. Water soluble cellulose ethers according to claim 15 wherein $R_1$ is hydroxypropyl and $R_2$ is ethyl.

20. Water-soluble cellulose ethers according to claim 11 wherein $m_1$, $m_2$ and $m_3$ are from 1 to 3, and $m_4$ is from 0.005 to 0.1.

21. Water soluble cellulose ethers according to claim 20 wherein $R_1$ is hydroxyethyl, $R_2$ is hydroxypropyl and $R_3$ is methyl.

22. A water-base coating composition comprising a latex coating composition including a film forming latex resin and an aqueous phase thickened with a water soluble cellulose ether according to claim 1.

23. Water soluble nonionic cellulose ethers comprising hydrophobic unit-hydrophilic unit ether groups which are alkyloxy-alkyleneoxy-2-hydroxypropylene ether groups, the hydrophilic ether units being from one to six alkyleneoxy groups of two or three carbon atoms, selected from —CH$_2$CH$_2$O—; —CH$_2$CH—O—; and —CH$_2$CH$_2$CH$_2$O—; and one 2-hydroxypropylene group, the hydrophobic ether units being alkoxy groups of the formula R—O— where R is an alkyl group having from about eight to about thirty carbon atoms; connected linearly in a group of the general formula:

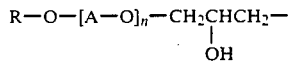

where AO is alkyleneoxy and n is from one to six.

24. Water-soluble nonionic cellulose ethers according to claim 23 wherein the alkyleneoxy is —CH$_2$CH$_2$O—.

25. Water-soluble nonionic cellulose ethers according to claim 23 wherein R is tetradecyl.

26. Water-soluble nonionic cellulose ethers according to claim 23 wherein n is 4.

27. Water-soluble nonionic cellulose ethers according to claim 23 wherein n is 1.

28. Water-soluble nonionic cellulose ethers according to claim 23 wherein n is 2.

29. Water-soluble nonionic cellulose ethers according to claim 23 wherein n is 3.

30. Water-soluble nonionic cellulose ethers according to claim 23 wherein R is tetradecyl and A is CH$_2$CH$_2$.

31. Water-soluble nonionic cellulose ethers according to claim 23 wherein the alkyloxyalkyleneoxy-2-hydroxy propyleneoxy group is:

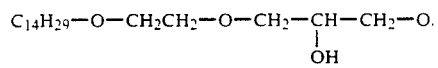

32. Water-soluble nonionic cellulose ethers according to claim 23 having the formula:

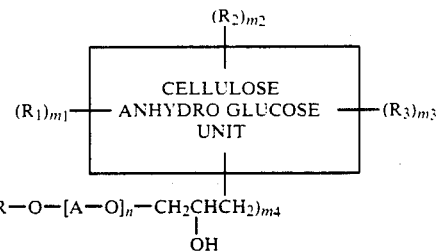

wherein:
R$_1$, R$_2$ and R$_3$ are selected from
  (a) alkyl having from one to four carbon atoms;
  (b) hydroxyalkyl having from two to four carbon atoms;
  (c) alkylphenyl having from about seven to about nine carbon atoms;
R is alkyl having from about eight to about thirty carbon atoms;
n is 1 to about 6; and is an average number;
m$_1$, m$_2$ and m$_3$ are 0 to 3; and m$_4$ is 0.002 to 0.2;
m$_1$, m$_2$, m$_3$ and m$_4$ are average numbers representing the degree of substitution.

33. Water soluble cellulose ethers according to claim 32 wherein m$_1$ is from 1 to 3, m$_2$ and m$_3$ are zero and m$_4$ is from 0.005 to 0.1.

34. Water soluble cellulose ethers according to claim 33 wherein R$_1$ is hydroxyethyl.

35. Water soluble cellulose ethers according to claim 33 wherein R$_1$ is methyl.

36. Water soluble cellulose ethers according to claim 32 wherein m$_1$ and m$_2$ are each from 1 to 3, and m$_4$ is from 0.005 to 0.1.

37. Water soluble cellulose ethers according to claim 36 wherein R$_1$ is hydroxyethyl and R$_2$ is ethyl.

38. Water soluble cellulose ethers according to claim 36 wherein R$_1$ is hydroxyethyl and R$_2$ is methyl.

39. Water soluble cellulose ethers according to claim 36 wherein R$_1$ is hydroxypropyl and R$_2$ is methyl.

40. Water soluble cellulose ethers according to claim 36 wherein R$_1$ is hydroxypropyl and R$_2$ is ethyl.

41. Water soluble cellulose ethers according to claim 32 wherein m$_1$, m$_2$ and m$_3$ are from 1 to 3, and m$_4$ is from 0.005 to 0.1.

42. Water soluble cellulose ethers according to claim 41 wherein R$_1$ is hydroxyethyl, R$_2$ is hydroxypropyl and R$_3$ is methyl.

43. A water-base coating composition comprising a latex coating composition including a film forming latex resin and an aqueous phase thickened with a water soluble cellulose ether according to claim 23.

* * * * *